Oct. 4, 1927.
J. M. ANGELETTI
1,644,221
SELF ADJUSTING DRAWING INSTRUMENT
Filed Sept. 14, 1925
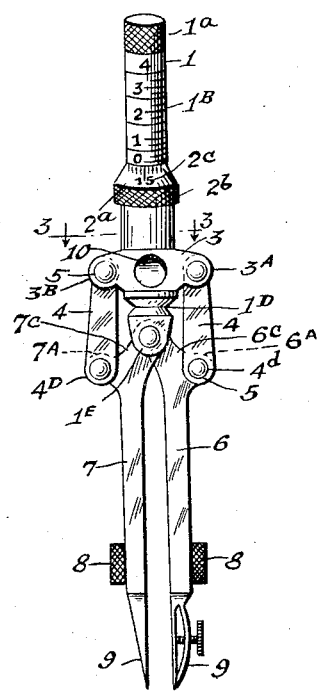
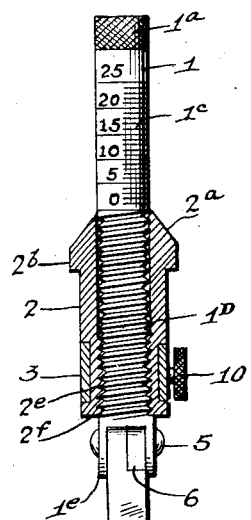
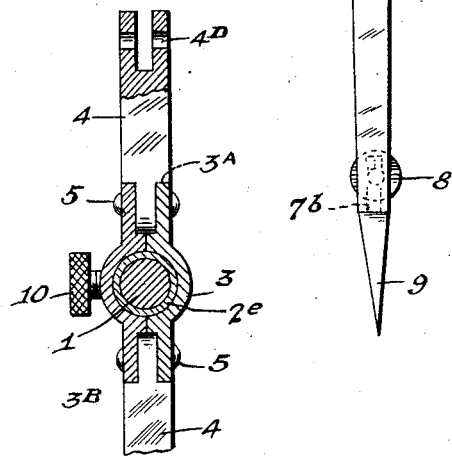
Inventor
Joseph M. Angeletti.

Patented Oct. 4, 1927.

1,644,221

UNITED STATES PATENT OFFICE.

JOSEPH M. ANGELETTI, OF NEW YORK, N. Y.

SELF-ADJUSTING DRAWING INSTRUMENT.

Application filed September 14, 1925. Serial No. 56,277.

The invention relates more particularly to instruments used by draftsmen, toolmakers, machinists, and other mechanics, for drawing, marking, and dividing purposes, and it does in part refer to those instruments with which to draw continuous involutes producing spiral figures which are often necessary for illustrating spiral springs, etc.

The main object of my invention is to provide a drawing instrument which adjusts itself to continuous diameter variations during the clockwise revolutions of its marking leg, thereby producing a spaced involute with more facility and precision by one either skilled or unskilled in the drafting art.

Another object of the invention is that, while this instrument is self-adjusting, it is also operative for drawing circles, arcs, etc., without any variation of its set combination.

A further object is to provide the instrument with conveniently located graduations to facilitate its diameter adjustments without employment of separate measuring instruments and without the need of removing the instrument from its centered positions.

With these and other objects in view the invention will be hereinafter more fully described with reference to the accompanying drawings forming a part of this specification, and will then be pointed out in the claims at the end of the description.

In the drawings:

Fig. 1 is a perspective view of a complete form of self-adjusting drawing instrument embodying my invention, showing same in a partially open position.

Fig. 2 is an enlarged fragmentary side view of the instrument and

Fig. 3 is an enlarged fragmentary top view taken on the lines 3—3 of Fig. 1.

Referring now to the parts composing the instrument so that its construction and operation may be clearly understood, I wish to point out that all the numerals accompanied by a letter, indicates that it is a member of the part bearing that number, with the exception that all the borings required to mount the parts of the instrument together, will be referred to as $4^D$ and all the pins required to fasten said parts will be referred to as 5.

Referring now to Figs. 1 and 2, the instrument consists principally of a rod support 1, having a knurled head $1^A$. On the cylindrical wall of the support are graduations of inch and portions thereof $1^B$, and a micrometer scale $1^C$, said inch graduations and micrometer scale are oppositely disposed each occupying approximately half of the cylindrical wall of said support as at Figs. 1 and 2. The lower cylindrical part of said support has threads $1^D$ and said threads are preferably of fine micrometer exactness as to render diameter adjustments of the instrument as accurate as possible. The support in addition has a forked end $1^E$ having borings $4^D$, as at Figs. 1 and 2.

An adjusting sleeve 2 has a beveled head $2^A$ bearing micrometer decimals $2^C$ corresponding to the micrometer scale $1^B$ of the support. Said sleeve has a knurled collar $2^B$ and a cylindrical groove $2^E$ the interior wall of which is partly threaded as at $2^F$ Fig. 2 and said threads are adapted to screw along the threads of the support.

A crosshead 3 preferably composed of two parts form oppositely projecting forks $3^A$ and $3^B$. Said crosshead is swiveled in groove $2^E$ of the sleeve and pivotally carries a pair of links 4, by the forks $3^A$, $3^B$ of the crosshead. Said forks and links have borings $4^D$ in which are inserted connecting pins 5 as at Figs. 1 and 3.

Adjusting sleeve 2 bearing the swiveled crosshead is screwed on threads $1^D$ of the support as at Figs. 1 and 2.

Pivoted in the forked end $1^E$ of the support are a pair of legs 6 and 7 and said legs have a shoulder or projection $6^A$ and $7^A$ each having a boring $4^D$, through which they are pivotally connected to links 4, by means of pins 5, driven in said borings, as at Figs. 1 and 2. At the lower end of said legs are sockets $6^B$ and $7^B$, in which similar points 9 are inserted and secured by set screws 8, which are threaded in the wall of said sockets.

The instrument point 9 may be of any known nature, such as pencil, pen, needle, marker, calipers, etc.

To enable the operator to lock the instrument to a desired calibration, especially when the instrument is employed as a divider or caliper, I provide a screw lock 10, which is threaded on the wall of one part of said cross head, and the prong of said screw lock communicates with the cylindrical groove $2^E$ of the sleeve, as at Figs. 2 and 3 by tightening said screw the swiveled crosshead is locked to said sleeve thereby allowing the latter to retain more securely the diameter adjustments of said legs.

The operation of the instrument is as follows:

When it is desired to employ the instrument for drawing involutes or spiral figures, the leg of the instrument bearing the needle point is centered on the drawing paper, the adjusting sleeve is held stationary with the left hand at its knurled collar, while the support is rotated with the right hand from its knurled head, thus screwing the support in said sleeve, thereby imparting a continuous radial and rotary movement to the leg bearing the marking or pen point. If it is desired that the involute shall end in a closed circle, it is simply necessary to remove the left hand from holding said sleeve, thereby allowing the latter to revolve with the support during which the marking leg will retain its diameter.

It will be considered that in practice involutes or spiral figures are required of varying diameters whose adjacent turns shall be at predetermined distances according to the requirements. This with my instrument may be accomplished with facility as follows: A line is drawn on the drawing paper and the needle point centered on said line, the adusting sleeve is held with the left hand only a desired fraction of its revolution, using the micrometer decimals which are provided on the beveled head of said sleeve and which correspond to the micrometer scale provided on the rotative support which is revolved with the right hand as above explained, after the fractional withholding of said sleeve same is left to revolve with the support until the marking leg reaches one of the sides of said divided line when said sleeve is withheld again for another similar fraction and then left to revolve again with the support, and so on until the desired involute is completed. It will be noted that it is not necessary to remove the instrument from its centered position for drawing a spiral whose continuous involutes shall be of varying diameters or spaced revolutions, for example, the beginning of the spiral, the involutes shall be spaced ⅛ for 5 rotations, and then $\tfrac{3}{32}$ for 7 rotations, $\tfrac{1}{16}$ for another 7 rotations, ¼ for 3 rotations, and the end turn shall be closed. This as above explained may be accomplished by simply withholding the adjusting sleeve in accordance with the provided graduations.

For drawing circles, arcs, etc., the legs are diametrically adjusted by rotating the sleeve and holding the support, or rotating the support and withholding the sleeve. Thereafter the instrument is clockwisely revolved without holding the sleeve.

For dividing and calibrating purposes, the instrument is adjusted also by rotating the sleeve and holding the support or the legs, and by rotating the support and holding the sleeve when it is desired to render the instrument more secure to its set calibration against accidental misplacements of the instrument etc.; it is simply required to tighten the screw lock, or set screw, which is provided on the wall of the swivelled crosshead and which communicates with the wall of the cylindrical groove of the sleeve thereby locking the same.

In the foregoing description, I have embodied the preferred form of my invention but I do not wish to be understood as limiting myself thereto, as I am aware that modifications may be made therein without departing from the principle or sacrificing any of the advantages of this invention, therefore, I reserve to myself the right to make such changes as fairly fall within the scope of the appended claims.

Having thus described my invention, I claim as new and desire to secure by Letters Patent:—

1. A self-adjusting drawing instrument comprising a rod support having a threaded cylindrical wall, a pair of legs, means pivotally mounting said legs on one of the ends of said support and means for imparting a simultaneous radial and rotary movement to said pivoted legs, said means consisting of a sleeve with an interiorly threaded cylindrical wall adapted to screw along the threads of said support, a crosshead swiveled on said sleeve, a pair of links each pivotally connected to the crosshead and to its respective pivoted leg, a collar member on said sleeve adapted to allow the operator to hold said sleeve with one hand while the support with the legs are being revolved with the other hand.

2. In a self adjusting drawing instrument the combination of a rod support having a portion of its cylindrical wall threaded, there being graduations on the unthreaded wall portion of the support, said support having a forked end of a sleeve having a beveled head and an interiorly threaded cylindrical wall adapted to screw along the threads of the support, of a crosshead swiveled on said sleeve below said head, a pair of legs pivoted in the forked end of said support by a single pin therethrough, said legs having each a lateral projection pivotally supporting a link pivoted to said crosshead for allowing said legs to be radially swung simultaneously of their rotative movement, when said sleeve is held stationary with one hand and the support rotated with the other, there being instrument point sockets on the lower ends of said legs having each a set screw adapted to removably fasten said points in said sockets.

3. In a self-adjusting drawing instrument a rod support having a portion of its cylindrical wall threaded, and having on the unthreaded wall portion a micrometer scale, and a graduation of inches and fractions thereof, of a forked end on the support below its threaded wall portion, and a knurled head above its graduated wall.

4. In an instrument of the class described the combination of a rod support having a portion of its cylindrical wall threaded, there being a micrometer scale on the unthreaded wall portion of said support, a pair of legs pivoted to said support, means for imparting a simultaneous radial and rotary movement to said pivoted legs, said means consisting of a sleeve adapted to screw along the threads of said support and having a tubular extension traveling along said micrometer scale, of a crosshead swiveled on said sleeve below its tubular extension, said crosshead pivotally supporting a pair of links each pivoted to its respective pivoted leg, said sleeve having a knurled collar member on its tubular extension adapted to permit the operator to hold said sleeve with one hand, while the support and relatively pivoted parts are being revolved with the other hand, means for alternately regulating the radial movement of said pivoted legs simultaneously of their rotary movement, said means consisting of a beveled head on the tubular extension of said sleeve, said head having micrometer decimals movable along said micrometer scale and adapted to be read in concert therewith, when the sleeve is held stationary and the support rotated, and a set-screw threaded on the circular wall of the swiveled crosshead adapted to secure the said sleeve to said crosshead.

5. An instrument of the class described, comprising a sleeve having a portion of its interior wall threaded, and its remaining portion smooth bore, a knurled beveled collar integral with the smooth bore and the sleeve and bearing micrometer graduations, there being a cylindrical groove at the threaded end of said sleeve.

6. In an instrument of the class described, a sleeve having an exterior circumferential groove, a crosshead swiveled in said groove composed of two complemental parts each having corresponding oppositely disposed lugs there being aligned borings thru corresponding lugs, and a set screw threaded through the cylindrical wall of a part of said cross head for locking the latter to the sleeve.

JOSEPH M. ANGELETTI.